(12) United States Patent
Kumar et al.

(10) Patent No.: US 8,062,431 B2
(45) Date of Patent: Nov. 22, 2011

(54) METHOD AND APPARATUS FOR CLEANING AND DE-ICING WIND TURBINE ROTOR BLADES

(75) Inventors: Raj Kumar, Uttar Pradesh (IN); Vijaykumar Muppayya Hiremath, Karnataka (IN); Dhanasekarakannan Sakkaraju, Tamilnadu (IN); Kavala Venkateswara Rao, Andhra Pradesh (IN); Narasimhamurthy Raju Nadampalli, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/485,492

(22) Filed: Jun. 16, 2009

(65) Prior Publication Data

US 2010/0132738 A1 Jun. 3, 2010

(51) Int. Cl.
*B08B 7/04* (2006.01)
*B08B 3/00* (2006.01)
(52) U.S. Cl. ........... 134/10; 134/34; 134/42; 134/104.2; 134/110; 134/94.1
(58) Field of Classification Search ............... 134/34, 134/36, 42, 94.1, 104.2, 104.4, 109, 110, 134/111, 10; 416/146 R
See application file for complete search history.

(56) References Cited

U.S. PATENT DOCUMENTS

| | | | |
|---|---|---|---|
| 6,890,152 B1 * | 5/2005 | Thisted | 416/1 |
| 7,217,091 B2 * | 5/2007 | LeMieux | 416/95 |
| 7,521,083 B2 * | 4/2009 | Teichert | 427/140 |
| 7,740,107 B2 * | 6/2010 | Lemburg et al. | 182/142 |
| 7,802,961 B2 * | 9/2010 | Grabau | 415/4.3 |
| 2005/0042102 A1 * | 2/2005 | Teichert | 416/146 R |

FOREIGN PATENT DOCUMENTS

| | | |
|---|---|---|
| WO | 0017086 A1 | 3/2000 |
| WO | 2004/022970 A1 | 3/2004 |
| WO | WO 2005054672 A1 * | 6/2005 |

\* cited by examiner

*Primary Examiner* — Alexander Markoff
(74) *Attorney, Agent, or Firm* — James McGinness, Esq.; Armstrong Teasdale LLP

(57) ABSTRACT

A method of cleaning at least one of grime and built-up ice off a rotor blade of a wind turbine includes, in an exemplary embodiment, positioning a rotor blade in an immobile position in a downward orientation substantially parallel to the tower, positioning a tank containing a cleaning solution directly below the rotor blade, and positioning a plurality of lifting arms adjacent the tank. The plurality of lifting arms are attached to an elliptical spray head with at least one pipe connected to the elliptical spray head and to a pump operatively coupled to the tank. The method also includes raising the lifting arms to lift the elliptical spray head to a predetermined position along a longitudinal axis of the rotor blade, pumping cleaning solution from the tank to the elliptical spray head, spraying the cleaning solution onto an outer surface of the rotor blade to clean the rotor blade, and collecting the spent cleaning solution in the tank.

17 Claims, 3 Drawing Sheets

METHOD AND APPARATUS FOR CLEANING AND DE-ICING WIND TURBINE ROTOR BLADES

BACKGROUND OF THE INVENTION

The field of the invention relates generally to wind turbine rotor blades, and more particularly a method and apparatus for cleaning and de-icing wind turbine rotor blades.

The rotor blades of wind turbines are designed for optimum aerodynamic properties to optimize the wind turbine's performance for maximum generation of electricity. During operation of wind turbines, the rotor blades are exposed to numerous atmospheric conditions that may cause a build-up of grime from dust, salt, dead insects, bird droppings, and other foreign substances, on the surface of the rotor blades. Dirty rotor blades decrease the efficiency of the wind turbine. During operation of wind turbines, ice can build-up on the rotor blades in extreme cold weather. The ice build-up on the turbine blades may cause an imbalance in the rotor that may increase the turbine load. In addition, ice build-up on the turbine blades may decrease the efficiency of the wind turbine due to a change on the aerodynamic shape of the turbine blades.

Typically, the rotor blades are cleaned naturally by rain. However, at sites with low rainfall, the rotor blades are not sufficiently cleaned for optimum performance. In these situations, manual cleaning of the rotor blades is used. Cleaning the rotor blades is beneficial in facilitating the generation of more energy, measured as annual energy production.

Known techniques of manually cleaning rotor blades may include positioning the manpower at the appropriate work position and height. These known techniques are time-consuming, require appropriate levels of manpower, and are costly.

BRIEF DESCRIPTION OF THE INVENTION

In one aspect, a method of cleaning at least one of grime and built-up ice off a rotor blade of a wind turbine that includes a tower and a plurality of rotor blades is provided. The method includes positioning a rotor blade in an immobile position in a downward orientation substantially parallel to the tower, positioning a tank containing a cleaning solution directly below the rotor blade, and positioning a plurality of lifting arms adjacent the tank. The plurality of lifting arms are attached to an elliptical spray head. At least one pipe is connected to the elliptical spray head and to a pump operatively coupled to the tank. The method also includes raising the lifting arms to lift the elliptical spray head to predetermined position along the longitudinal axis of the rotor blade, pumping cleaning solution from the tank to the elliptical spray head, spraying the cleaning solution onto an outer surface of the rotor blade to clean the rotor blade, and collecting the spent cleaning solution in the tank.

In another aspect, a cleaning apparatus for cleaning at least one of grime and built-up ice off wind turbine rotor blades is provided. The cleaning apparatus includes a tank, a plurality of lifting arms adjacent the tank and an elliptical spray head attached to the lifting arms. The lifting arms are sized to lift the elliptical spray head from a first position to a second position, the second position is farther away from the tank than the first position. The cleaning apparatus also includes at least one pipe with a first end of the pipe connected to the elliptical spray head, and a second end of the pipe operatively coupled to a pump. The pump is operatively coupled to the tank.

DETAILED DESCRIPTION OF THE INVENTION

A method and apparatus for cleaning and/or de-icing the outer surface of wind turbine rotor blades is described below in detail. Spent cleaning solution used to clean and/or de-ice a rotor blade is collected, filtered, and reused to clean other rotor blades. The cleaning solution may be used to remove grime from the rotor blade and/or remove ice from the rotor blade. The cleaning apparatus is positioned so as to collect the spent cleaning solution for reuse. The apparatus includes an elliptical spray head that surrounds a portion of the rotor blade to permit cleaning all outer surfaces at once. The elliptical spray head is attached to lifting arms that move the spray head along the longitudinal axis of the rotor blade to permit cleaning of the outer surface along the length of the rotor blade. A cylindrical collection curtain may be attached to the elliptical spray head at one end and at the second end attached to a tank holding the cleaning solution to encircle the rotor blade and to direct the sprayed cleaning solution that does not land on the rotor blade back into the tank for reuse. Clean rotor blades increase the performance of the wind turbines and provide for increased annual energy production. In addition, the method and apparatus for cleaning and/or de-icing rotor blades facilitates improved life of the rotor blades, and maintains the aerodynamic shape of the blades. Further, by recycling the cleaning solution, the transportation cost of cleaning solution is reduced because a lower amount of cleaning solution for rotor blade maintenance is used. The use of the collection curtain facilitates capturing sprayed cleaning solution, even in moderate and high wind conditions, and directing a larger quantity of cleaning solution to the tank.

Figure 1:
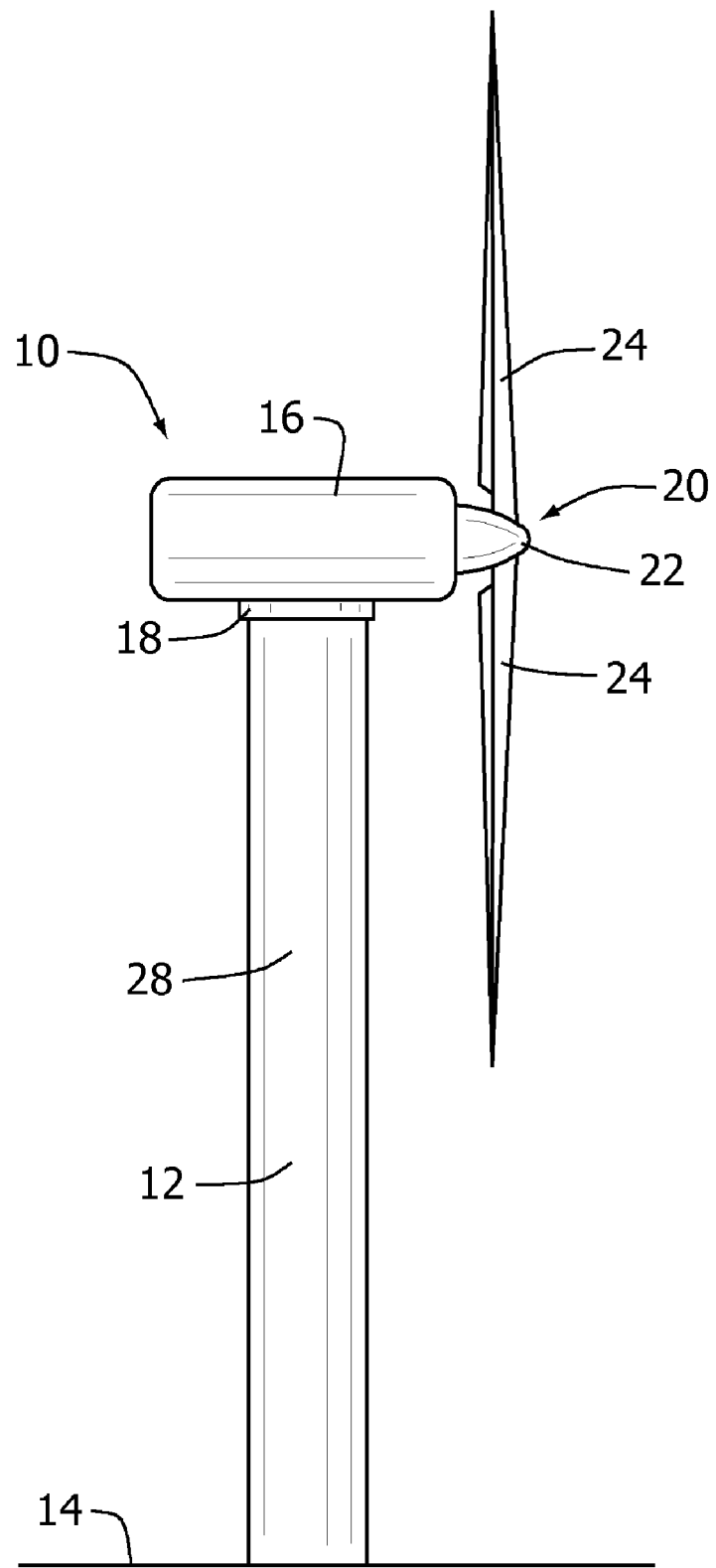
FIG. 1 is a side elevation schematic illustration of a wind turbine.

Referring to the drawings, FIG. 1 is a side elevation schematic illustration of a wind turbine 10, such as, for example, a horizontal axis wind turbine. Wind turbine 10 includes a tower 12 extending from a supporting surface 14, a nacelle 16 mounted on a frame 18 of tower 12, and a rotor 20 coupled to nacelle 16. Rotor 20 includes a hub 22 and a plurality of rotor blades 24 coupled to hub 22. In the exemplary embodiment, rotor 20 includes three rotor blades 24. In an alternative embodiment, rotor 20 includes more or less than three rotor blades 24. In the exemplary embodiment, tower 12 is fabricated from tubular steel and includes a cavity 28 extending between supporting surface 14 and nacelle 16. In an alternate embodiment, tower 12 is a lattice tower.

Various components of wind turbine 10, in the exemplary embodiment, are housed in nacelle 16 on top tower 12 of wind turbine 10. The height of tower 12 is selected based upon factors and conditions known in the art. In some configurations, one or more microcontrollers in a control system are used for overall system monitoring and control including pitch and speed regulation, high-speed shaft and yaw brake application, yaw and pump motor application and fault monitoring. Alternative distributed or centralized control architectures are used in alternate embodiments of wind turbine 10. In the exemplary embodiment, the pitches of blades 24 are controlled individually. Hub 22 and blades 24 together form wind turbine rotor 20. Rotation of rotor 20 causes a generator to produce electrical power.

In use, blades 24 are positioned about rotor hub 22 to facilitate rotating rotor 20 to transfer kinetic energy from the wind into usable mechanical energy. As the wind strikes blades 24, and as blades 24 are rotated and subjected to centrifugal forces, blades 24 are subjected to various bending moments. As such, blades 24 deflect and/or rotate from a neutral, or non-deflected, position to a deflected position. Moreover, a pitch angle of blades 24 can be changed by a pitching mechanism to facilitate increasing or decreasing blade 24 speed, and to facilitate reducing tower 12 strike.

Figure 2:
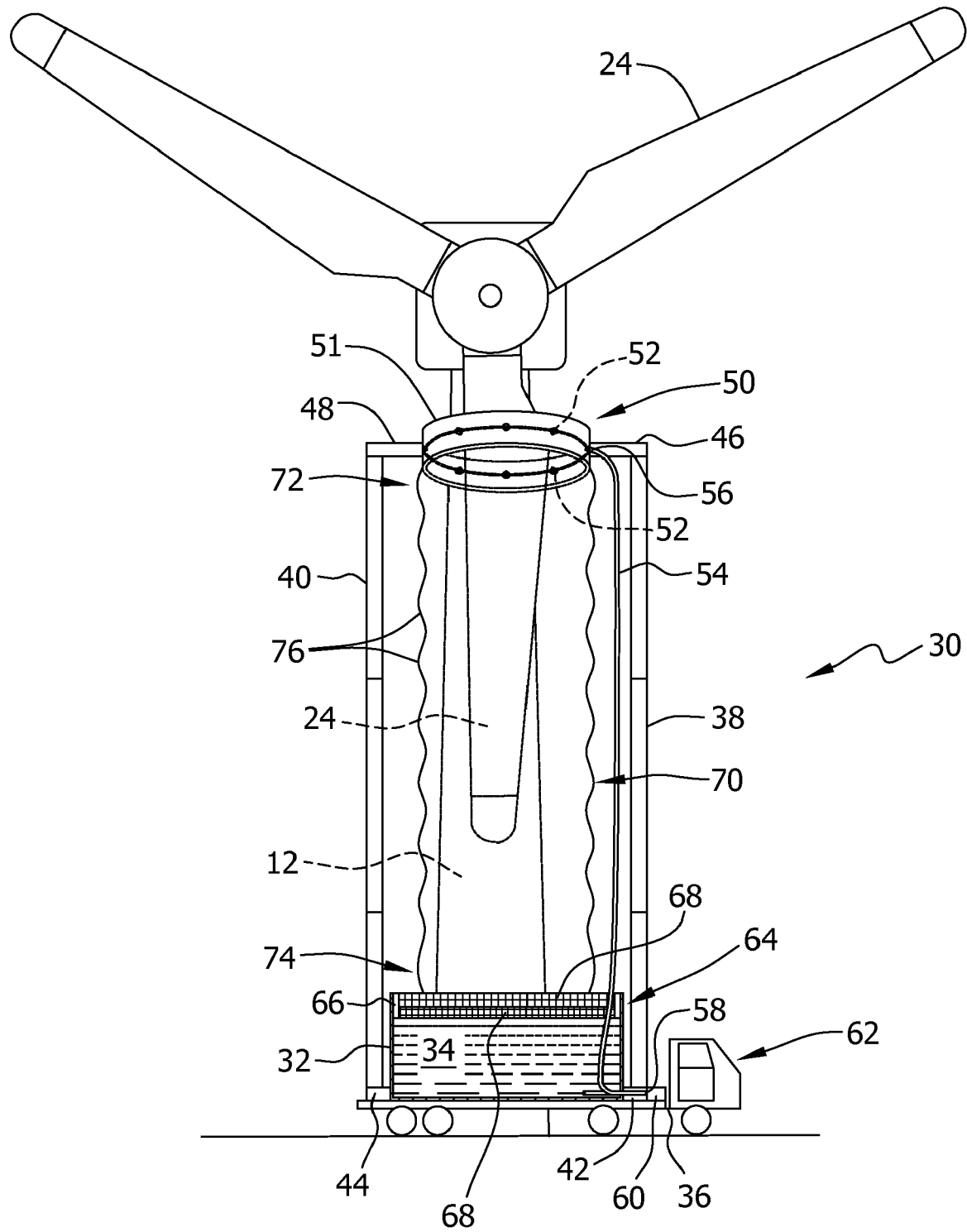
FIG. 2 is a front elevation schematic illustration of a cleaning apparatus in position to clean the turbine rotor blades of the wind turbine shown in FIG. 1.

Referring also to FIG. 2, a rotor blade cleaning apparatus 30 may be used to clean and/or de-ice the surfaces of rotor blades 24 to remove ice and grime from, for example, dust, salt, dead insects, bird droppings, and other foreign substances. The buildup of grime and/or ice on rotor blades 24 can decrease the efficiency of wind turbine 10. A comparative analysis of dirty rotor blades versus clean rotor blades shows that the annual energy production (AEP) of a wind turbine with dirty rotor blades may be from about 90% to about 98% of the AEP of a wind turbine with clean blades at annual mean wind speeds of 4 meters per second (m/s) to 11 m/s. Table I lists the results of this analysis.

TABLE I

| Annual Mean Wind Speed (m/s) | AEP from Clean Blade (MW · h) | AEP from Dirty Blade (MW · h) | Dirty Blade AEP as % of Clean Blade AEP | % Difference |
| --- | --- | --- | --- | --- |
| 4.0 | 1152.8 | 1043.3 | 90.50 | 9.50 |
| 5.0 | 2221.5 | 2066.8 | 93.04 | 6.96 |
| 6.0 | 3441.6 | 3263.3 | 94.82 | 5.18 |
| 7.0 | 4636.1 | 4452.9 | 96.05 | 3.95 |
| 7.5 | 5180.3 | 4999.4 | 96.51 | 3.49 |
| 8.0 | 5672.7 | 5496.1 | 96.89 | 3.11 |
| 8.5 | 6104.9 | 5933.9 | 97.20 | 2.80 |
| 9.0 | 6472.4 | 6308.0 | 97.46 | 2.54 |
| 10.0 | 7010.6 | 6860.5 | 97.86 | 2.14 |
| 11.0 | 7305.6 | 7169.7 | 98.14 | 1.86 |

Cleaning apparatus 30, in an exemplary embodiment, includes a tank 32, that holds a cleaning solution 34, mounted on a base 36. In one embodiment, cleaning solution 34 removes grime from rotor blades 24. In another embodiment, cleaning solution 34 removes built-up ice from rotor blades 24, and in still another embodiment, cleaning solution 34 removes both grime and built-up ice from rotor blades 24. Two lifting arms 38 and 40 are positioned adjacent tank 32. Lifting arms 38 and 40 are coupled to hydraulic lifts 42 and 44 that move lifting arms 38 and 40 vertically upward from base 36 and downwards towards base 36. In one embodiment, lifting arms 38 and 40 are telescoping arms that telescope out and in utilizing hydraulic fluid from hydraulic lifts 42 and 44. In another embodiment, lifting arms 38 and 40 are raised and lowered by movement of hydraulic lifts 42 and 44. Hydraulic lifts 42 and 44 are attached to base 36 and lifting arms 38 and 40 are operatively coupled to hydraulic lifts 42 and 44. An elliptically shaped spray head 50 is attached to lifting arms 38 and 40 by attachment arms 46 and 48. Elliptical spray head 50 includes an elliptical member 51 and a plurality of spray nozzles 52 attached to elliptical member 51 that spray cleaning solution 34 onto rotor blade 24 to clean the surface of blade 24. Spray nozzles 52 are operatively coupled to at least one cleaning solution feed pipe 54. Elliptical spray head 50 is sized so that elliptical member 51 surrounds a portion of rotor blade 24 which positions spray nozzles 52 adjacent the surface of rotor blade 24 for spraying cleaning solution 34 onto rotor blade 24.

A first end 56 of pipe 54 is coupled to elliptical spray head 50 and a second end 58 of pipe 54 is coupled to a pump 60 which is operatively coupled to tank 32. Pipe 54 is a flexible pipe, a flexible hose, or a flexible tube. Pipe 54 can be formed from any suitable material, for example, braided stainless steel, rubber, plastic, or combinations thereof.

Base 36 may be mounted on any suitable vehicle 62 that is capable of transporting cleaning apparatus 30 to wind turbine 10 for the cleaning and/or de-icing of rotor blades 24. For example, base 36 may be mounted on a truck or a boat. In another embodiment, base 36 is the bed of a truck or the deck of a boat.

A filtration device 64 is positioned over the top 66 of tank 32. Filtration device 64 includes at least one filter pad 66 formed from a filter media 68. Any suitable filter media may be used, for example, woven and nonwoven fabrics, porous membranes, and the like. Filtration device 64 filters spent cleaning solution 34 to permit recycling and reuse of cleaning solution 34. Because of the ability to recycle cleaning solution 34, the total amount of cleaning solution 34 needed to clean and/or de-ice rotor blades 24 in a wind turbine farm is lowered, thereby lowering maintenance costs.

In one embodiment, cleaning apparatus 30 also includes a collection curtain 70 to collect and redirect sprayed cleaning solution 34 back into tank 30. Collection curtain 70 has a cylindrical shape that encircles rotor blade 24 when collection curtain is raised into position. A first end 72 of collection curtain 70 is attached to elliptical spray head 50 and a second end 74 is attached to tank 32. Collection curtain is moved into position encircling blade 24 when elliptical spray head 50 is raised by lifting arms 38 and 40. In one embodiment, collection curtain 70 includes a plurality of accordion folds 76 that permit collection curtain 70 to expand and contract like an accordion bellows when raised and lowered by lifting arms 38 and 40. Sprayed cleaning solution trapped by collection curtain 70 is returned to tank 32. Collected cleaning solution 34 passes through filtration device 64 before entering tank 32. Collection curtain 70 can be formed from a thin plastic sheet or a fabric made from any suitable material, for example, nylon, polyethylene, polyesters, polyamid, polyolefin, thermoplastic polyurethane, polyetherimide, polyphenyl ether, polyphenylene sulfide, polysulfone, aramid, and mixtures thereof To clean and/or de-ice rotor blades 24 of wind turbine 10, rotor blade 24 is positioned in a downward orientation substantially parallel to tower 12 and made immobile Cleaning apparatus 30 is positioned adjacent tower 12 and below the rotor blade 24 with tank 32, containing cleaning solution 34, directly below rotor blade 24. Lifting arms 38 and 40 are activated to lift elliptical spray head 50 and collection curtain 70 to a predetermined position along the longitudinal axis of rotor blade 24. Cleaning solution 34 is pumped from tank 32 to elliptical spray head 50 and sprayed though spray nozzles 52 onto an outer surface of rotor blade 24. In one embodiment, cleaning solution 34 is sprayed at a pressure of about 100 psi to about 7000 psi, in another embodiment, about 200 psi to about 5000 psi, and in another embodiment, about 200 psi to about 3000 psi. Elliptical spray head 50 is moved along the longitudinal axis of rotor blade 24 while spraying cleaning solution onto the outer surface of rotor blade 24 to clean and/or de-ice substantially the entire the length of rotor blade 24. The spent cleaning solution 34 runs down rotor blade 24, drips off the end of blade 24, passes through filtration device 64, and is collected in tank 32 for reuse. In addition, sprayed cleaning solution 34 that does not land on rotor blade 24 is captured by collection curtain 70 and is returned to tank 32 after passing through filtration device 64.

Figure 3:
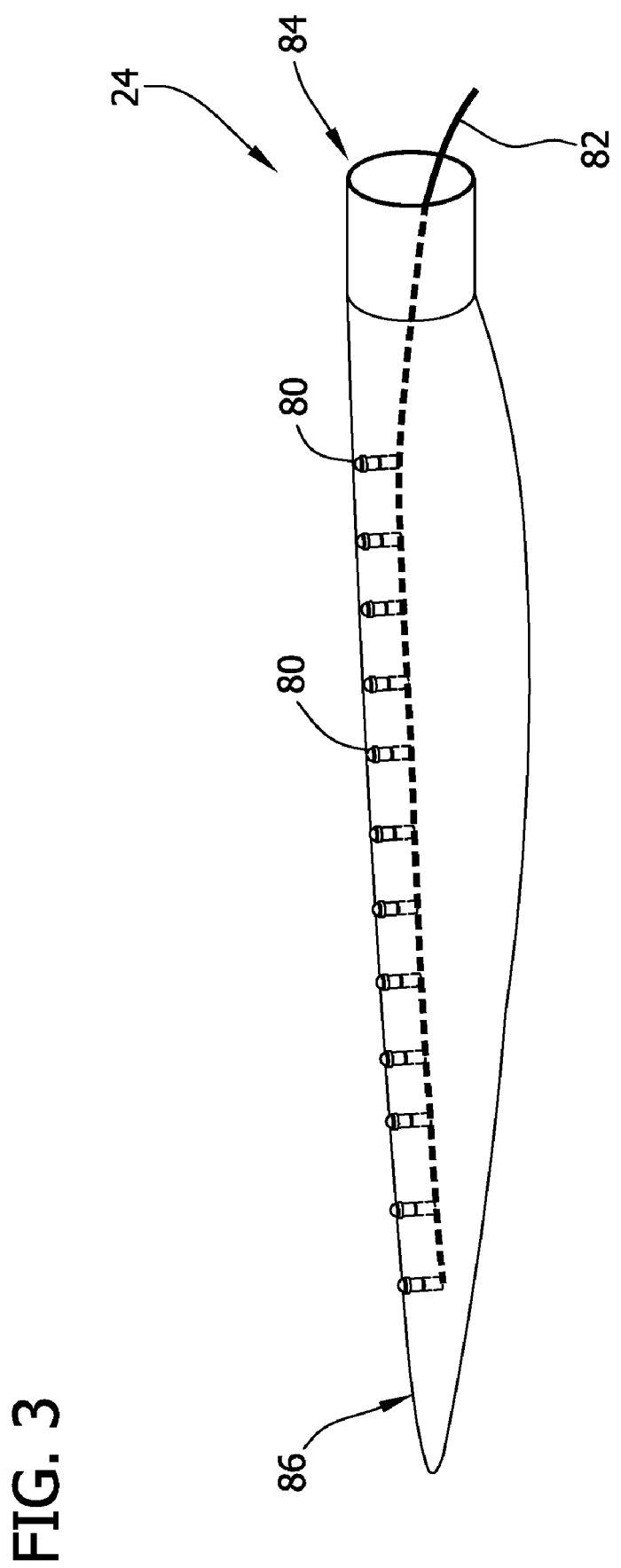
FIG. 3 is a perspective schematic illustration of a turbine rotor blade that includes a plurality of spray nozzles for cleaning and/or de-icing the surface of the blade.

In another embodiment, shown in FIG. 3, rotor blade 24 includes a plurality of spray nozzles 80 mounted along the length of rotor blade 24. Spray nozzles 80 are operatively coupled to a cleaning solution supply line 82 positioned within rotor blade 24. Cleaning solution supply line 82 extends between a root 84 to a tip 86 of blade 24 and is coupled to cleaning solution feed pipe 54 (shown in FIG. 2) to direct cleaning solution 34 from tank 32 (shown in FIG. 2) to spray nozzles 80.

In addition, spray nozzles 80 can be used to de-ice rotor blade 24 by spraying heated fluid or heated gases through spray nozzles 80. Rotor blade icing can be a problem at cold sites. De-icing of rotor blades is beneficial to mitigate the loads due to asymmetry of the rotor plane from the iced rotor blades. The fluid or gases can be heated by any known technique, for example, a heater attached to feed pipe 54, heating the fluid in tank 32, or passing the fluid through the turbine gearbox radiator, or any other heat source. In one embodiment, the fluid or gases are heated to about 90° F. to about 200° F., in another embodiment, about 100° F. to about 160° F.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of applying a solution to a rotor blade of a wind turbine, the wind turbine comprising a tower and a plurality of rotor blades, said method comprising:
   positioning a rotor blade in an immobile position in a predetermined orientation;
   positioning a tank directly below the rotor blade, the tank containing a cleaning solution;
   positioning a plurality of lifting arms adjacent the rotor blade, the plurality of lifting arms attached to an elliptical spray head, the elliptical spray head is sized to surround a portion of the rotor blade;
   connecting at least one pipe to the elliptical spray head and to a pump operatively coupled to the tank;
   raising the lifting arms to lift the elliptical spray head to a predetermined position along a longitudinal axis of the rotor blade;
   pumping cleaning solution from the tank to the elliptical spray head;
   spraying the cleaning solution onto an outer surface of the rotor blade to clean the rotor blade;
   attaching a first end of a collection curtain to the elliptical spray head and a second end of the collection curtain to the tank;
   permitting spent cleaning solution to run down the outer surface of the rotor blade and fall off the rotor blade; and
   collecting the spent cleaning solution in the tank.

2. A method in accordance with claim 1 further comprising moving the elliptical spray head along the longitudinal axis of the rotor blade while spraying the cleaning solution onto the outer surface of the rotor blade.

3. A method in accordance with claim 1 wherein positioning a rotor blade in an immobile position in a predetermined orientation comprises positioning a rotor blade in an immobile position in a downward orientation substantially parallel to the tower.

4. A method in accordance with claim 1, wherein the elliptical spray head comprises a plurality of spray nozzles.

5. A method in accordance with claim 1, wherein collecting the spent cleaning solution in the tank comprises filtering the spent cleaning solution through a filtering device, the filtering device comprising at least one filter pad comprising a filter media.

6. A method in accordance with claim 1, further comprising mounting the tank and the plurality of lifting arms on a base.

7. A method in accordance with claim 5, further comprising heating the cleaning solution.

8. A method in accordance with claim 1, wherein, the collection curtain has a cylindrical shape sized to encircle the rotor blade.

9. A method in accordance with claim 8, wherein the collection curtain includes a plurality of accordion folds that permit the collection curtain to expand and contract.

10. A cleaning apparatus for cleaning at least one of grime and built-up ice off wind turbine rotor blades, said cleaning apparatus comprising:
    a tank mounted on a base;
    a plurality of lifting arms mounted on said base adjacent said tank;
    an elliptical spray head attached to said lifting arms, said lifting arms sized to lift said elliptical spray head from a first position to a second position, said second position farther away from said tank than said first position;
    at least one pipe, a first end of said pipe connected to said elliptical spray head, and a second end of said pipe operatively coupled to a pump, said pump operatively coupled to said tank; and
    a collection curtain comprising a first end and a second end, said first end attached to said elliptical spray head and said second end attached to said tank, said collection curtain having a cylindrical shape sized to encircle said rotor blade and said elliptical spray head.

11. A cleaning apparatus in accordance with claim 10, wherein said elliptical spray head comprises a plurality of spray nozzles.

12. A cleaning apparatus in accordance with claim 10, wherein said elliptical spray head is sized to surround a portion of a wind turbine rotor blade.

13. A cleaning apparatus in accordance with claim 10, wherein said tank comprises a filtering device for filtering used cleaning solution.

14. A cleaning apparatus in accordance with claim 13, wherein said filtering device comprises at least one filter pad comprising a filter media.

15. A cleaning apparatus in accordance with claim 10, wherein said base is mounted on a vehicle, said vehicle comprising a truck, a trailer, or a boat.

16. A cleaning apparatus in accordance with claim 10, wherein said collection curtain comprises a plurality of accordion folds that permit said collection curtain to expand and contract.

17. A cleaning apparatus in accordance with claim 10, further comprising a plurality of spray nozzles mounted along a length of a wind turbine rotor blade, said spray nozzles operatively coupled to a feed line extending through said rotor blade, said feed line operatively coupled to said at least one pipe.

* * * * *